United States Patent [19]

Suzuki

[11] Patent Number: 4,862,700
[45] Date of Patent: Sep. 5, 1989

[54] METHOD FOR CONTROLLING THE OPERATION OF A VARIABLE DISPLACEMENT REFRIGERANT COMPRESSOR FOR A CAR AIR-CONDITIONER

[75] Inventor: Shinichi Suzuki, Kariya, Japan

[73] Assignee: Kabushiki Kaisha Toyoda Jidoshokki Seisakusho, Aichi, Japan

[21] Appl. No.: 212,885

[22] Filed: Jun. 29, 1988

[30] Foreign Application Priority Data

Jul. 4, 1987 [JP] Japan ................. 62-167313

[51] Int. Cl.$^4$ .................. F25B 1/02; B60H 1/32; F04B 1/28
[52] U.S. Cl. ........................ 62/115; 62/133; 62/228.5; 417/222; 417/53
[58] Field of Search ............. 417/53, 222 S; 62/115, 62/133, 228.5

[56] References Cited

U.S. PATENT DOCUMENTS

| | | | |
|---|---|---|---|
| 4,132,086 | 1/1979 | Kountz | 62/228.5 |
| 4,510,764 | 4/1985 | Suzuki | 62/228.5 |
| 4,796,438 | 1/1989 | Sato | 62/228.5 |

FOREIGN PATENT DOCUMENTS

| | | | |
|---|---|---|---|
| 93614 | 4/1988 | Japan | 62/133 |
| 2153922 | 8/1985 | United Kingdom | 417/222 S |

Primary Examiner—William L. Freeh
Attorney, Agent, or Firm—Burgess, Ryan & Wayne

[57] ABSTRACT

A method for controlling the operation of a variable displacement refrigerant compressor arranged in a car air-conditioner circuit and driven by a car engine via a solenoid clutch is carried out in a manner such that, when a car engine rotating speed is lower than an idling speed and when either one of a brake pedal or a manual brake of the car is released after temporary stoppage of the car, a control device having a CPU unit therein issues a control signal to cause a displacement varying wobble plate element of the variable displacement refrigerant compressor to be always moved angularly to a predetermined position to obtain a minimum displacement condition of the compressor, so that the compressor is restarted from the minimum displacement condition when the car is restarted after a temporary stoppage thereof at, e.g., an intersection of a vehicle road.

6 Claims, 3 Drawing Sheets

METHOD FOR CONTROLLING THE OPERATION OF A VARIABLE DISPLACEMENT REFRIGERANT COMPRESSOR FOR A CAR AIR-CONDITIONER

BACKGROUND OF THE INVENTION

1. Field of the Invention

The present invention relates to a method for controlling the operation of a variable displacement refrigerant compressor, especially a variable displacement wobble plate type compressor accommodated in a car air-conditioner, and driven by a car engine via a solenoid clutch. More particularly, it relates to a method for controlling the operation of a variable displacement refrigerant compressor accommodated in a car air-conditioner by which an acceleration of a car engine is not adversely affected when starting the car after a temporary stoppage of the car.

2. Description of the Related Art

Generally, a variable displacement refrigerant compressor accommodated in a car air-conditioner is driven by a car engine via a solenoid clutch, and therefore, when the car is to be started or accelerated, a large load due to inertia of the car per se, and an additional load due to the inertia of the variable displacement refrigerant compressor of a car air-conditioner, are simultaneously applied to a car engine, and accordingly, the acceleration of the car engine is adversely affected.

Japanese Unexamined Patent Publication No. 57-195884 discloses one compressor operating method intended to solve such problems of the conventional car air-conditioner. Namely, the method of Japanese Unexamined Patent Publication No. 57-195884 is carried out in a manner such that when an overall load applied to a car engine exceeds a predetermined value, a detection signal is transmitted to a control means to decrease a displacement of a variable displacement compressor. More specifically, to carry out the above-mentioned method, an accelerator pedal of the car is operatively connected to a drive means which drives a displacement changing member of variable displacement refrigerant compressor, and therefore, the displacement changing member of the compressor, e.g., a conventional non-rotary wobble plate of a variable displacement wobble plate type compressor as disclosed in, for example, U.S. Pat. No. 4,428,718 to Skinner, is moved by the drive means between maximum and minimum displacement positions in association with a movement of the accelerator pedal of the car.

Alternatively, an engine speed detector is arranged to detect the number of rotations of a crankshaft of the car engine, and a detected speed signal is transmitted to an electric control device of the air-conditioner. Therefore, when the control device detects that a rate of change in the speed of the car engine is larger than a predetermined value, the above-mentioned drive means for driving the displacement changing member is operated to move the displacement changing member from the maximum to the minimum displacement position.

Nevertheless, in the former case wherein the drive means of the variable displacement refrigerant compressor is operated in association with the movement of the accelerator pedal of the car, the drive means is operated only after the accelerator pedal is pressed down from an initial position to a predetermined position, and therefore, the operation of the drive means involves a time delay ranging from 0.5 second to 1.0 second with respect to the movement of the accelerator of the car, and accordingly, this time delay of the operation of the drive means prevents a rapid acceleration of the car.

In the latter case wherein the drive means of the variable displacement refrigerant compressor is operated in connection with speed of the car engine, the time needed for the detection of the engine speed carried out by the engine speed detector, as well as for the calculation of the rate of change in the detected engine speed carried out by a differential circuit means of the electric control device of the compressor, is substantial, and therefore, the operation of the drive means to move the displacement changing member of the compressor is delayed, and accordingly, a rapid acceleration of the car is prevented as in the former case.

At this stage, when a car provided with an air-conditioner is driven in the city, the car must repeatedly stop, start, and accelerate from a temporary stoppage at many intersections. During a temporary stoppage of the car, the car engine is idling at a low rotation speed, and as a result, the compressor of the air-conditioner is necessarily rotated at a low speed at which the compressing motion of the compressor is slow. Therefore, the displacement changing member of the compressor is often forcibly moved to the maximum displacement position to increase the refrigerating function of the air-conditioner, and thus, when the car is to be started and accelerated from a temporary stoppage, a relatively long time is needed to move the displacement changing member of the compressor back to minimum displacement position. Particularly, when a variable displacement wobble plate type compressor is accommodated in the air-conditioner, the position of the displacement changing member consisting of a wobble plate is determined by a dynamic relationship among pressures in a crankcase chamber, a discharge chamber, a suction chamber of the compressor, and a force of return spring arranged to urge the wobble plate toward the minimum displacement position, and consequently, it generally takes 3 to 6 seconds for the displacement changing member to be moved to the minimum displacement position. Therefore, the car engine cannot be rapidly accelerated due to a load of the variable displacement refrigerant compressor.

SUMMARY OF THE INVENTION

An object of the present invention is to obviate the defects encountered by the conventional operating method for a car air-conditioner in which a variable displacement refrigerant compressor is accommodated.

Another object of the present invention is to provide a method for controlling the operation of a variable displacement refrigerant compressor for a car air-conditioner whereby the car may be started and rapidly accelerated from a temporary stoppage thereof at, e.g., intersections of city roads.

A further object of the present invention is to provide a novel method for controlling the operation of a variable displacement wobble plate type compressor for a car air-conditioner in accordance with a programmed operation of a control device of the car air-conditioner.

In accordance with the present invention, there is provided a method for controlling the operation of a variable displacement refrigerant compressor incorporating therein a displacement varying means, and an actuating means for actuating the displacement varying means and arranged to be driven, by an engine of a car via a solenoid clutch, in a closed refrigerant circuit of a car air-conditioner including a refrigerant gas condenser connected to the compressor, a refrigerant receiver connected to the refrigerant gas condenser, an expansion valve connected to the refrigerant receiver, an evaporator connected to the expansion valve and to the compressor, and a control means operatively connected to the actuating means of the compressor for controlling the displacement of the compressor, comprising the steps of:

supplying a first monitoring signal from an accelerator pedal monitoring sensor to the control means to thereby inform the control means that a rotating speed of the engine has been reduced to a predetermined speed due to a non-operation of an accelerator pedal by a driver of the car;

supplying a second monitoring signal from at least a brake pedal monitoring sensor and a manual brake monitoring sensor to the control means to thereby inform the control means that at least one of the brake pedal and the manual brake has been released to start the car after a temporary stoppage thereof;

issuing a predetermined first control signal from the control means to operate the actuating means at a predetermined operating condition as soon as the control means receives both the first and second monitoring signals; and moving the displacement varying means to a predetermined position whereat a minimum displacement of the compressor is obtained in response to the predetermined operating condition of the actuating means.

DESCRIPTION OF THE PREFERRED EMBODIMENTS

Figure 1:
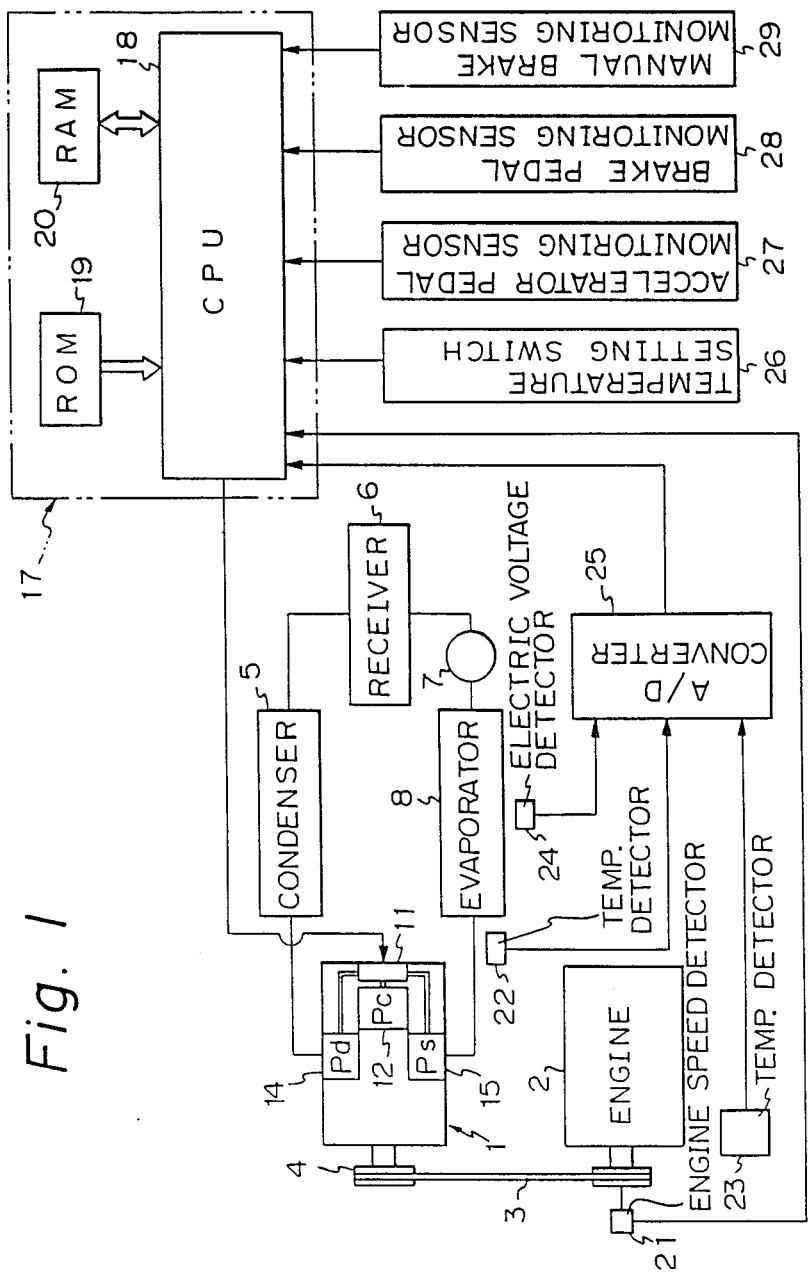
FIG. 1 shows a schematic view of an automatic air conditioner system.

Referring to FIG. 1, a car air-conditioner includes a variable displacement refrigerant compressor 1 driven by a car engine 2 via a belt-pulley transmission mechanism 3 and a solenoid clutch 4, which clutch 4 is electromagnetically connected and disconnected to drive and stop the compressor 1. The air-conditioner also includes a condenser 5 for condensing a compressed refrigerant discharged from the compressor 1, a receiver 6 for receiving a condensed refrigerant delivered from the condenser 5, an expansion valve 7, and an evaporator 8 for a heat-exchange, these elements being connected to one another in series.

Figure 3:
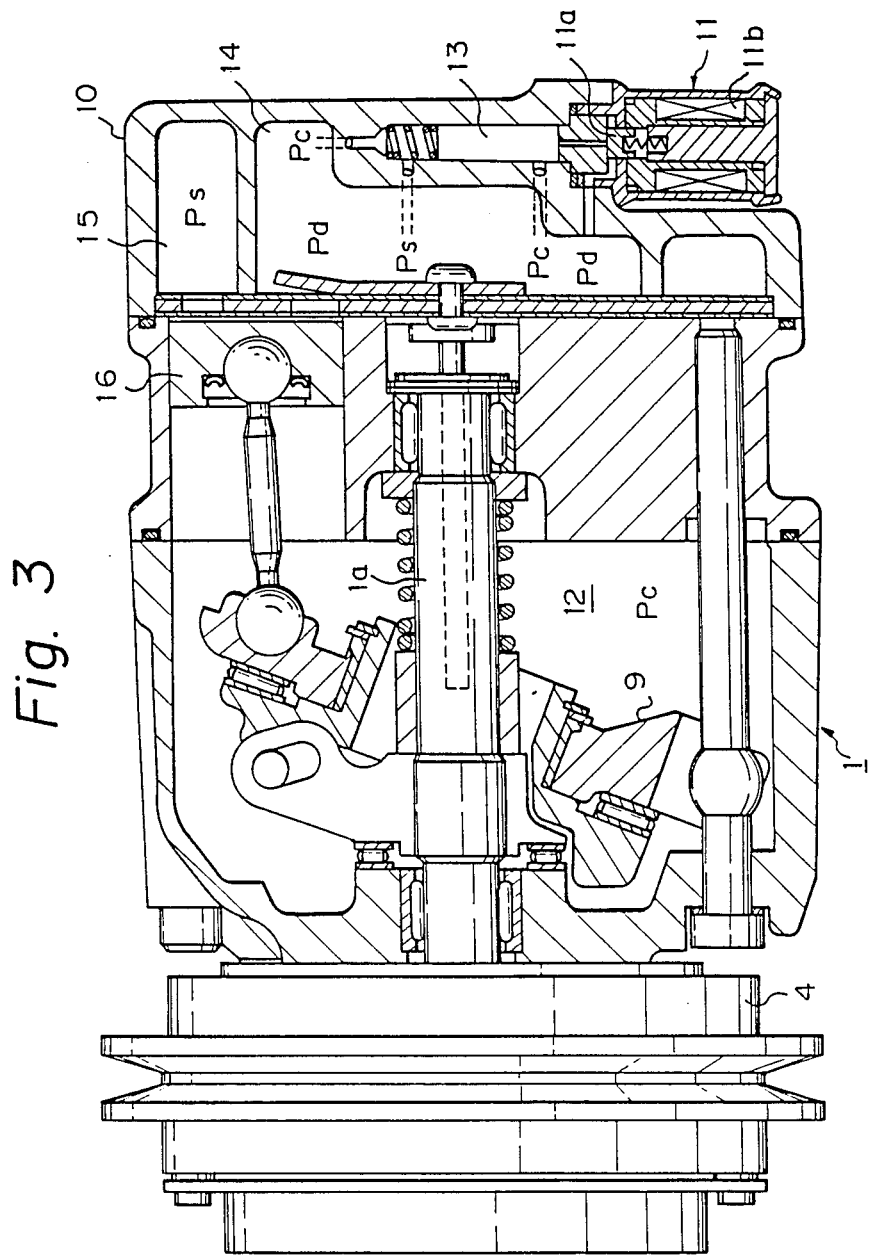
FIG. 3 shows a cut away view of the air conditioner compressor and solenoid operated control valve.

Preferably, the variable displacement refrigerant compressor 1 is a variable displacement wobble plate type compressor 1, as illustrated in FIG. 3, having a non-rotatable and angularly displacable wobble plate 9 and a solenoid-operated control valve 11 arranged within a rear head 10 to cause an angular displacement of the wobble plate 9.

In FIG. 3, the solenoid-operated control valve 11 is provided with a valve element 11a which is moved axially by an energization and deenergization of the solenoid 11b and controls a pressure Pc in a crankcase chamber 12 within which the above-mentioned wobble plate 9 is mounted around a drive shaft 1a rotated by a car engine. When the valve element 11a of the solenoid-operated control valve 11 is moved by the solenoid 11b, a corresponding movement of a spool valve 13 occurs, to allow a fluid communication between the crankcase chamber 12 (pressure Pc) and a discharge chamber 14 (pressure Pd), and that between the crankcase chamber 12 and a suction chamber 15 (pressure Ps), to be switched. As a result, an amount of high pressure refrigerant gas flowing from the discharge chamber 14 toward the crankcase chamber 12 is regulated to thereby adjust a pressure Pc within the crankcase chamber 12, and therefore, vary the angular position of the wobble plate 9. A change in the angular position of the wobble plate 9 causes an increase and decrease of an axial stroke of each piston 16, which in turn varies the displacement of the compressor. At this stage, the energization and deenergization of the solenoid 11b of the solenoid-operated control valve 11 are controlled by a duty ratio control method briefly described in , e.g., U.S. Pat. No. 4,747,754 to Fujii et al, under the control of an externally arranged control device 17 schematically shown in FIG. 1.

Referring again to FIG. 1, the control device 17 includes a central processing unit (hereinafter referred to as a CPU) 18, a program memory 19 comprising a read-only-memory (ROM) storing therein control programs, and an operating memory 20 comprising a random access memory temporarily storing a result of an operation of the CPU 18. The CPU 18 has input terminal receiving, either directly or via an A/D converter 25, output signals sent by an engine-rotation detector (a tachometer) 21, a temperature detector 22 monitoring and detecting a temperature at an outlet of the evaporator 8, an ambient temperature detector 23, and an electric voltage detector 24 detecting an electric voltage applied to a fan of the evaporator 8. The CPU 18 of the control device 17 is provided with an additional input terminal to receive an output signal from a temperature setting switch 26, which outputs a signal in correspondence to a desired temperature of air blowing through the evaporator 8 into a compartment of a car. Upon receiving the signal output by the temperature setting switch 26, in addition to the signals output by the above-mentioned various detectors 21 through 24, the CPU 18 calculates the optimum control variables to be set for a feedback control system including the variable displacement wobble plate type compressor 1 and the solenoid-operated control valve 11. The operation of the CPU 18 includes a calculation of a duty ratio of the solenoid 11b of the solenoid-operated control valve 11 which is suitable for obtaining an optimum displacement of the wobble plate type compressor. the solenoid 11b is energized by the calculated duty ratio. The line extending from the CPU 18 of the control device 17 to the solenoid-operated control valve 11 in FIG. 1 indicates an electric drive line for supplying electric power in accordance with the calculated duty ratio.

The CPU 18 of the control device 17 has other input terminals for receiving signals from an accelerator pedal monitoring sensor 27, a brake pedal monotoring sensor 28, and a manual brake monitoring sensor 29. The accelerator pedal monitoring sensor 27 is arranged to detect whether or not an accelerator pedal (not shown) of a car is moved by a driver from an initial non-operated position, and transmits ON and OFF signals depending on the operation or non-operation of the accelerator pedal. The brake pedal monitoring sensor 28 is arranged to detect whether or not a brake pedal (not shown) of the car is operated or pressed down by the driver for applying a braking force to the car, and transmits ON and OFF signals depending on the operation or non-operation of the brake pedal. The manual brake monitoring sensor 29 is arranged to detect whether or not a manual brake of the car is operate by the driver from a non-operated released position. When released, the manual brake monitoring sensor 29 transmits an OFF signal to the CPU 18.

The operation of the air-conditioner of FIGS. 1 and 3 will be described hereinbelow with reference to the flow chart of FIG. 2, in addition to FIGS. 1 and 3.

While a car is ordinarily driven with the air-conditioner thereof as illustrated in FIGS. 1 and 3 driven by the engine of the car, the CPU 18 of the control device 17 constantly receives signals from the detectors 21 through 24, and in turn, controls the duty ratio of the solenoid-operated control valve 11 of the wobble plate type compressor 1 to operate the compressor 1 at a displacement optimal for achieving a desired temperature condition in the driver's compartment thereof.

On the other hand, when the car is temporarily stopped at, e.g., an intersection on a road, the car driver releases the accelerator pedal to bring the car engine to an idling state, and at that time either presses down the brake pedal or operates the manual brake. At this time, since the car engine per se is still driving the air-conditioner, the rotating speed of the car engine becomes lower than the idling speed. When the control device 17 detects that the car engine is rotated at a speed lower than the idling speed (an OFF signal is transmitted from the sensor 27), and that either the accelerator pedal or the manual brake is operated (an ON signal is transmitted from the sensor 28 or 29), the CPU 18 of the control device 17 actuates the solenoid- operated valve 11 of the variable displacement wobble plate type compressor 1, and the wobble plate 9 is in turn angularly moved to a large displacement position whereat the displacement of the compressor 1 is increased to thereby raise a refrigerating performance of the car air-conditioner. That is, a compensation for the low speed rotation of the compressor 1 is carried out by increasing the angularity of the wobble plate 9 during the temporary stoppage of the car (step (1) of FIG. 2).

Figure 2:
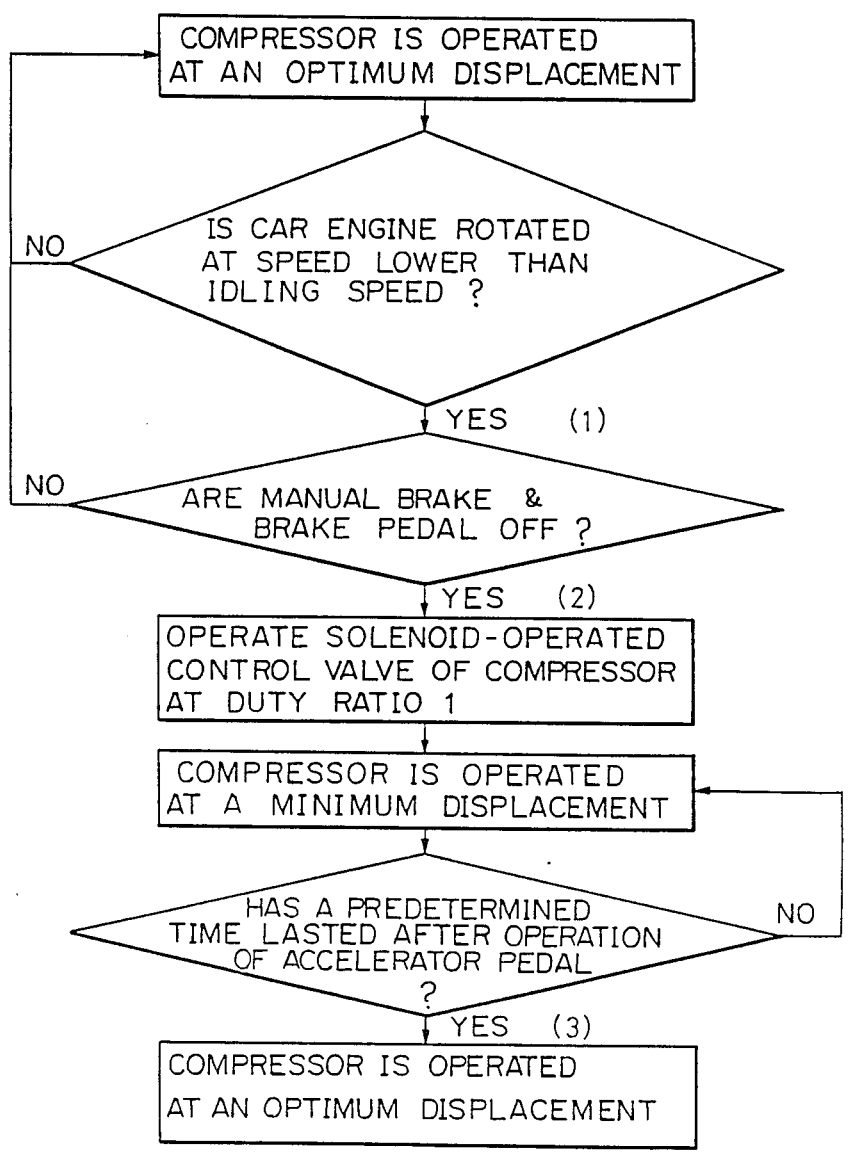
FIG. 2 shows a flow chart of the operation of the control system for the air conditioner.

When the car is re-started from the temporary stoppage thereof by releasing both or either the brake pedal and the manual brake, the brake pedal monitoring sensor 28 and the manual brake monitoring sensor 29 transmit signals indicating the OFF sites of the brake pedal and the manual brake, respectively, to the CPU 18 of the control device 17 of the car air-conditioner to inform the CPU 18 that the brake pedal and the manual brake have both been made OFF (step (2) of FIG. 2). Upon receipt of the OFF indication signals from the sensors 28 and 29, the CPU 18 immediately issues a drive signal to operate and control the solenoid-operated control valve 11 of the compressor 1 at the duty ratio 1, and as a result, the wobble plate 9 of the compressor 1 is moved to an angular position whereat fluid communication between the crankcase 12 and the discharge chamber 14 of the compressor 1 is established, and the pressure Pc within the crankcase 12 and the pressure Pd within the discharge chamber 14 are in equilibrium, and as a result, the displacement of the wobble plate type compressor 1 is rapidly brought to the minimum level.

At this stage, it should be noted that temporary stoppages of cars at an intersection usually last for less than 1 minute. Taking this into consideration, it will be understood that, during the temporary stoppages of the car, the refrigerant circuit of the car air-conditioner can not obtain a balanced pressure condition from the moment when the car is braked and when the operation of the compressor 1 is urged to be varied toward the maximum displacement state. Therefore, the compressor will not, in practice, be brought to the maximum displacement operation after a time elapse of less than 1 minute. Accordingly, after the temporary stoppage of the car, when the CPU 18 receives the OFF signal or signals from the sensor 28 and/or 29 in response to the restart of the car, the CPU 18 of the control device 17 immediately drives the solenoid-operated control valve 11 of the compressor 1 with the duty ratio 1 to thereby rapidly cause the operation of the compressor 1 to vary from a large displacement operation to a minimum displacement operation thereof, before the car driver operates the accelerator pedal. Thus, during a standard period of time for which the car engine is restarted and accelerated so that the car reaches a 40 km/hr running speed, the variable displacement refrigerant compressor 1 is operated at a minimum displacement state thereof. This ensures that, during acceleration of the car after a temporary stoppage, a substantial load is not applied to the car engine from the compressor 1 of the car air-conditioner, and therefore, the car is smoothly accelerated to a desired car speed.

When the CPU 18 discriminates that the acceleration of the car has lasted for a predetermined period of time (step (3) of FIG. 2), the CPU 18 stops the control operation by which the variable displacement refrigerant compressor 1 is driven under the minimum displacement condition, and controls the operation of the compressor 1 by the afore-mentioned ordinary method on the basis of the signals from the detectors 21 through 24. Alternatively, when the CPU 18 discriminates that the running speed of the car has reached a predetermined value based on a signal from an appropriate car speed detector, the CPU 18 may switch the above-mentioned minimum displacement control operation to the ordinary control operation. Further, the above determination of the CPU 18 may be made by detecting a time when a rate of change in the speed of the car engine becomes negative, on the basis of a signal transmitted from the engine speed detector 21.

Note that, as soon as the minimum displacement operation of the compressor 1 is discontinued, the operation of the compressor 1 is rapidly brought from the minimum to maximum displacement operation, to lower the temperature in the driver's compartment. This is because the minimum displacement operation of the compressor 1 during the above-described initial accelerating stage of the car causes a gradual increase of the temperature in the driver's compartment, and therefore, when the car compartment is cooled to a desired temperature, the operation of the compressor 1 is changed by the CPU 18 of the control device 17 from the maximum to an optimum displacement operation.

From the foregoing description of the preferred embodiment of the present invention it will be understood that, according to the present invention, when a car having an air-conditioner which includes a variable displacement refrigerant compressor is started by releasing the brake pedal and/or the manual brake after a temporary stoppage, the car is started and accelerated under a condition such that the operation of the compressor is always started from the minimum displacement condition thereof, and thus an excessive load is not applied by the air-conditioner to the car engine. Therefore, the car can be always smoothly and rapidly accelerated at an initial starting of the car after a temporary stoppage thereof at intersections of roads, especially congested city roads.

I claim:

1. A method for controlling the operation of a variable displacement refrigerant compressor incorporating therein a displacement varying means, and an actuating means for actuating the displacement varying means and arranged to be driven, by an engine of a car via a solenoid clutch, in a closed refrigerant circuit of a car air-conditioner including a refrigerant gas condenser connected to the compressor, a refrigerant receiver connected to the refrigerant gas condenser, an expansion valve connected to the refrigerant receiver, an evaporator connected to the expansion valve and to the compressor, and a control means operatively connected to the actuating means of the compressor for controlling the displacement of the compressor, comprising the steps of:

supplying a first monitoring signal from an accelerator pedal monitoring sensor to the control means to thereby inform the control means that a rotating speed of the engine has been reduced to a predetermined speed due to non-operation of an accelerator pedal;

supplying a second monitoring signal from at least a brake pedal monitoring sensor and a manual brake monitoring sensor to the control means to thereby inform the control means that at least one of the brake pedal and the manual brake has been released to re-start the car after a temporary stoppage thereof;

issuing a predetermined first control signal from the control means to operate the actuating means at a predetermined operating condition as soon as the control means receives both said first and said second monitoring signal; and moving the displacement varying means to a predetermined position whereat a minimum displacement of the compressor is obtained in response to the predetermined operating condition of the actuating means.

2. The method according to claim 1, further comprising the steps of:

issuing a predetermined second control signal from said control means to cancel said predetermined first control signal when said control means receives an ON signal from said accelerator monitoring signal, indicating that the accelerator pedal has been operated for a predetermined period of time after restarting of said car.

3. The method according to claim 1, wherein said displacement varying means comprises a non-rotatable angularly displacable wobble plate operatively connected to pistons of said compressor, said actuating means comprises a solenoid-operated control valve incorporating therein a solenoid actuator, and said predetermined control signal issued from said control means comprises an electric drive signal driving said solenoid actuator of said solenoid-operated control valve at a duty ratio 1.

4. The method according to claim 1, wherein said control means comprises a CPU unit connected to said accelerator pedal monitoring sensor, said brake pedal monitoring sensor, and said manual brake monitoring sensor, respectively, for carrying out a predetermined calculation to issue said predetermined first control signal to be supplied to said actuating means of said compressor, a ROM unit for storing therein programmed data to permit said CPU unit to carry out said predetermined calculation and issue said predetermined first control signal when said CPU unit receives said first and said second monitoring signals, and a RAM unit for temporarily storing a result of said predetermined calculation carried out by said CPU unit.

5. The method according to claim 4, wherein said CPU unit of said control means further receives a desired temperature indication signal for said car air-conditioner from a temperature setting switch operated by a driver of the car.

6. The method according to claim 5, wherein said CPU unit of said control means further receives at least an electric signal indicating a temperature of air blowing from said evaporator to thereby carry out a calculation for issuing another control signal different from said predetermined control signal and driving said actuating means until said displacement varying means is moved to a position whereat the displacement of said compressor is optimum for achieving said desired temperature while said car is driven.

* * * * *